Dec. 8, 1970   D. W. WALKER ET AL   3,545,930
COLORIMETRIC OXYGEN DETECTION
Filed Dec. 7, 1967

INVENTORS
D.W. WALKER
E.L. CZENKUSCH
BY *Young & Quigg*

ATTORNEYS

United States Patent Office 3,545,930
Patented Dec. 8, 1970

3,545,930
COLORIMETRIC OXYGEN DETECTION
Darrell W. Walker and Edward L. Czenkusch, Bartlesville, Okla., assignors to Phillips Petroleum Company, a corporation of Delaware
Filed Dec. 7, 1967, Ser. No. 688,880
Int. Cl. C07f 7/28; G01n 31/22
U.S. Cl. 23—232          16 Claims

ABSTRACT OF THE DISCLOSURE

Colorimetric qualitative and quantitative detection of oxygen in gaseous streams is effected by contacting at least a portion of the gaseous streams with a composition of a bis(cyclopentadienyl)titanium chloride on a solid support such as, for example, silica-alumina, and observing a color change which is indicative of the presence of oxygen, and its quantitative content in the gaseous stream.

---

This invention relates to colorimetric oxygen detection. In another aspect, this invention relates to novel compositions which are highly sensitive to the presence of (when contacted with) free oxygen. In still another aspect, this invention relates to an improved colorimetric oxygen detection device.

Conventional methods of detecting oxygen in gaseous streams are generally cumbersome and time consuming For example, when quantitatively measuring trace amounts of oxygen in a nitrogen stream by means of chromatography, any argon present will elute through the chromatographic column at about the same rate as the oxygen. Thus, it is necessary that the concentration of the oxygen plus argon be measured initially and then the concentration of the argon alone be measured in the same gas after the oxygen is removed therefrom. Such a method is neither rapid or precise, especially when the argon content of nitrogen greatly exceeds the oxygen content. Another technique for determining trace amounts of oxygen in nitrogen is a colorimetric analysis which comprises bubbling the nitrogen through cuprous amine complex. The accuracy of this method is generally satisfactory for continuous testing, but the procedure is cumbersome and time consuming.

One object of this invention is to provide an improved method and apparatus for detection of free oxygen in gaseous streams.

Another object of this invention is to provide a novel oxygen detecting composition, and a method for preparing the same.

According to one embodiment of this invention, a colorimetric oxygen indicating material is provided which comprises a composition of a bis(cyclopentadienyl)titanium chloride having the general formula

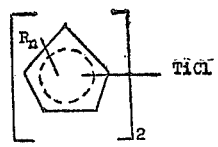

where R is an alkyl hydrocarbon radical having up to and including 5 carbon atoms per radical, and $n$ is 0–3 on a light hued, inert, porous, adsorbent, solid support, said support being substantially free of free oxygen. This composition has generally a bluish hue ranging from light blue to violet depending upon the concentration of the bis(cyclopentadienyl)titanium chloride, the color of the adsorbent, and other factors, and changes to yellow or orange upon contact with free oxygen.

According to another embodiment of this invention, a novel colorimetric oxygen indicator tube is provided.

Figure 1:
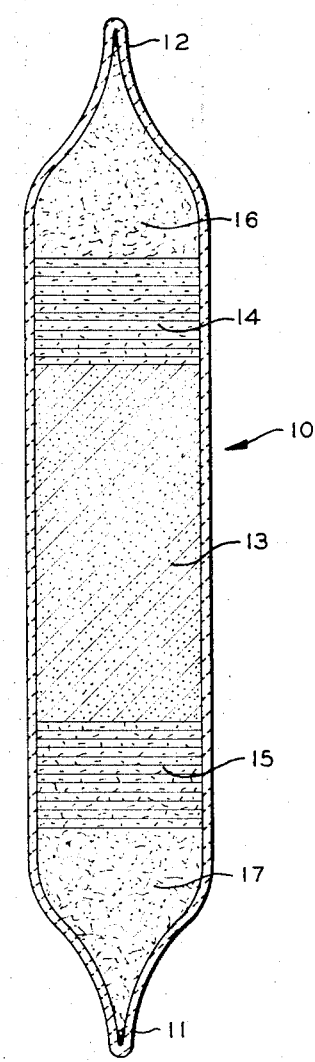
Figure 2:
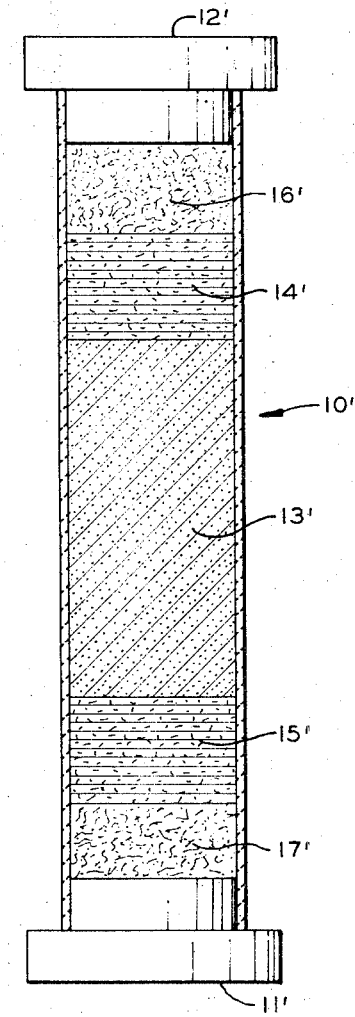

The drawings illustrate two embodiments of preferred indicator tubes of this invention. FIG. 1 is a cross-sectional view of a preferred glass indicator tube having frangible tips. FIG. 2 is an elevational view of the indicator tube of this invention having removable ends.

The bis(cyclopentadienyl)titanium chloride compounds of the present invention are known in the art. For example, J. D. Breslow, J. Am. Chem. Soc. 79, No. 18 5072–3 (1957) illustrates one method of preparation of the unsubstituted cyclopentadienyl complex compound. The alkyl-substituted complex compounds can be prepared in a similar manner. In general, the bis(cyclopentadienyl)titanium chloride compounds of the present invention are prepared by reacting one mole of bis(cyclopentadienyl)titanium dichloride with one or more moles of a triorganoaluminum compound in a convenient solvent. The product bis(cyclopentadienyl)titanium chloride can then be isolated and recovered by crystallization or other convenient methods.

Some specific titanium complex compounds which can be used in the invention are bis(cyclopentadienyl)titanium chloride, bis(methylcyclopentadienyl)titanium chloride, bis(ethylcyclopentadienyl)titanium chloride, bis(isopropylcyclopentadienyl)titanium chloride, bis(n-pentylcyclopentadienyl)titanium chloride, bis(1,3,4-trimethylcyclopentadienyl)titanium chloride, and the like and mixtures thereof.

The colorimetric oxygen indicating composition of this invention is made by incorporating the bis(cyclopentadienyl)titanium chloride on suitable adsorbent supports. Suitable supports include light hued, inert, porous solid adsorbents such as conventional catalyst supports, e.g., kieselguhr. It is preferred that the supports be substantially colorless or light in color, such as white or cream. A preferred group of supports are the difficulty reducible metal oxides such as zirconia, thoria, titania, magnesia, and the like, and mixtures thereof. The most preferred group of supports is the group consisting of alumina, silica, and silica-alumina of the type and quality conventionally used as catalysts or catalyst supports.

Before being incorporated with the titanium compound, the support is first pretreated in a manner conventional for catalysts or catalyst supports such as by heating at temperatures in the range of about 500–2000° F. for a time in the range of 0.1 to 24 hours. Heating can be effected in vacuum or in a stream of inert (i.e., substantially completely nonresidue under the conditions), dry gas such as nitrogen, helium, or hydrogen. A stream of air or oxygen-containing gases can be employed; however, when this is done the support must be freed of residual molecular oxygen before the incorporation of the bis(cyclopentadienyl)titanium chloride by sweeping with an oxygen-free gas or other means, preferably, at elevated temperatures. If desired, a series of gases can be passed over the support during pretreating. For example, nitrogen followed by hydrogen in series can be passed over the heated support.

The pretreated support is then contacted with the bis(cyclopentadienyl)titanium chloride or, preferably, a solution of the cyclopentadienyl compound in an inert solvent under substantially oxygen-free conditions. Suitable solvents include various paraffins such as pentane, hexanes, octanes, decanes, the cycloparaffins such as cyclohexane, aromatic hydrocarbons such as benzene, xylene, toluene, ethers, such as diethyl ether and dimethoxyethane, and mixtures of such solvents. These solvents are preferably freed of moisture and oxygen by distillation in the presence of calcium hydride, for example. The support effectively adsorbs the cyclopentadienyl compound and the solvent, if any, can be removed by evaporation. It is preferred that the indicating composition of this invention contain from about 1 to about 2 weight percent titanium (calculated as the metal though present as the complex compound) based upon the weight of the support material. More preferably, the composition should contain from about 1 to about 1.5 weight percent titanium. It is preferred that the indicating composition of this invention contain no water.

It is sometimes convenient to combine the preparation of the bis(cyclopentadienyl)titanium chloride compound with the impregnation of the support material, particularly, when the precursor material, the corresponding dichloride, is the more readily available material. In this embodiment, therefore, one mole of the selected bis(cyclopentadienyl)titanium dichloride is contacted with 1–10, preferably, 1–4 moles of a trialkylaluminum compound in a diluent, such as that previously described for the impregnation of the support, at a temperature and for a period of time sufficient for the formation of the desired bis(cyclopentadienyl)titanium chloride compound. This entire reaction mixture is then used to contact the suitably pretreated solid support material as an impregnating solution and the preparation of the indicating composition can be completed merely by evaporation of the readily volatile components such as described above. Thus, the bis(cyclopentadienyl) titanium chloride compound need not be isolated in this embodiment and no separation steps, save for filtering out any insoluble matter which may be present, need be carried out on the reaction mixture solution. Triethylaluminum is the presently preferred trialkylaluminum reagent but other homologs having up to about 10 carbons per alkyl radical can be used if desired.

The resulting compositions, in the absence of any contact with oxygen, have a bluish hue ranging from a pale blue color to a violet color. The particular color of any one indicator will depend upon such factors as the concentration of the cyclopentadienyl compound, the color of the adsorbent, and the presence of water. Generally, the indicators having the lower concentration of the cyclopentadienyl compounds will be light blue or blue while the indicators having higher concentrations of cyclopentadienyl compounds will be violet. The presence of water will result in a lighter hue such as light blue. Upon contact with oxygen the color is changed to yellow or orange. This color change is irreversible. This property makes these compositions especially suitable for qualitative and quantitative detection of oxygen and for scavenging molecular oxygen from dry gases and solutions. For example, a transparent tube can be packed with granules of the blue indicator and inserted in a flowing fluid stream containing trace amounts (e.g., 0.01 to 1000 p.p.m.) of oxygen. As the fluid flows through the indicator tube the color of the indicator changes. Thus, as the free oxygen in the fluid stream contacts the indicator, the color of the indicator will progressively change from a bluish hue to a yellow or orange with a sharp interface between the two colored zones. The rate of travel of this interface within the tube, is then proportional to the oxygen content of the fluid passed through the tube. When this rate is compared to previously calibrated standards, accurate determinations of free oxygen in the fluid can be made.

FIG. 1 is an illustration partly in section of a preferred glass indicator tube 10 having frangible tips 11 and 12 on either end thereof. The colorimetric oxygen indicator 13 is housed generally centrally in the glass tube 10 between guard bodies 14 and 15 which in turn are held in place by gas pervious retaining wads 16 and 17. Gas pervious retaining wads 16 and 17 can be any suitable nonporous low-surface, inert filler which is permeable to fluid flow. Preferably, these retaining rods are made of a fibrous material. Examples of suitable fillers include glass wool, glass cloth, asbestos, and fritted glass disks. These retaining wads serve to prevent the indicator and guard bodies from falling out of body 10 once frangible tips 11 and 12 are broken and removed.

Guard bodies 14 and 15 can be any suitable adsorbent such as charcoal or any of the above-described indicator supports. It is within the scope of this invention to utilize only a central bed of indicator 13 disposed between gas pervious retaining wads 16 and 17. However, the use of guard bodies 14 and 15 is preferred, especially when the fluid to be analyzed may contain traces of water. Such water, however, will not seriously interfere with the oxygen detection.

The body of indicator tube 10 can be any suitable size glass tube. For most operations, glass tubes having from 4 to 12 millimeters O.D. will suffice. The indicator tube is made by necking down one end of the tube to form a frangible tip and then packing the tube with the retaining wads, guard bodies and indicator under an inert atmosphere. The other end of the tube is then heated and necked down to form the other frangible tip. It is generally preferred that the indicator be in the form of granules being from 80–140 mesh to avoid excessive pressure drop in the indicator tube. However, the mesh size of the indicator will vary with the particular size tube which is utilized.

FIG. 2 is another illustration of an indicator tube of this invention. Tube body 10' can be made of any transparent oxygen-impermeable material such as glass, styrene-acrylonitrile copolymer, methyl methacrylate polymer, thermosetting polyester, and the like. Stoppers 11' and 12' are inserted within the opening ends of indicator 10' and form a very tight gas-proof fit. Indicator 13' is positioned generally centrally within indicator 10', between guard bodies 14' and 15' which are in turn positioned between gas permeable retaining wads 16' and 17'. Indicator 13', guard bodies 14' and 15', and retaining wads 16' and 17' are the same as indicator 13, guard bodies 14 and 15, and retaining wads 16 and 17, respectively as described above.

The indicating tubes can be calibrated by flowing a known amount of oxygen or a known amount of oxygen admixed with other gas through the tube for a known period of time and noting the length of the bed which has been converted from a bluish hue to a yellowish or orange color. As an illustration, assume that 10 cc. of oxygen (S.T.P.) contained in 990 cc. of nitrogen is passed through a bed which is 20 centimeters long and that 10 centimeters of the bed is converted from a bluish hue to a yellow or orange. The conversion would illustrate that a 1 centimeter length of the bed represents reaction with 1 cubic centimeter of oxygen. Next, assume that 50 liters of nitrogen, which contain an unknown amount of oxygen, is flowed through a similar bed and that 2 centimeters length of the bed is converted. Thus, the 50 liters of nitrogen contained 2 cc. of oxygen and the average oxygen content of the nitrogen stream is 40 parts per million by volume. Thus, the indicator tube of this invention can be used to quantitatively analyze oxygen in fluid streams.

The indicator tube of this invention can also be used to qualitatively determine the presence of oxygen. When used qualitatively, the most common application has been to check catalyst containers, activators, reactors, and other sorts of equipment for leaks. The indicator has been found to be sensitive to oxygen at concentrations as low as 1 part per million. Another use of our novel indicator is that of gas stream deoxygenation, wherein a sufficient quantity of the indicator of this invention can be contacted with a flowing gas stream to act as an oxygen scavenger and thereby remove substantially all of trace amounts of oxygen within the stream.

The following examples are given to better facilitate the understanding of this invention.

EXAMPLE 1

Preparation of the indicator

This example illustrates a method for preparing the novel colorimetric oxygen indicator of this invention.

Bis(cyclopentadienyl)titanium chloride was prepared according to the following procedure. A solution containing 2.5 parts by weight of bis(cyclopentadienyl) titanium dichloride in 8.7 parts by weight of dry toluene was mixed with a solution of 2.25 parts by weight of triethylaluminum in about 7 parts by weight of dry cyclohexane. Upon mixing the two solutions a reaction occurred with the evolution of a gas and the solution turned blue. The gas was found to contain in mole percent: methane, 7.9 percent; ethane, 44.4 percent; ethylene, 36.5 percent; ethylchloride, 10.1 percent; and butane, trace. The blue solution was filtered and to the clarified filtrate ether was added. Green crystals formed and these were filtered and washed three times with dry diethyl ether and then three times with dry toluene. These crystals were stored in the absence of oxygen. A sample was taken for analysis. The results were as follows:

| Element | Found | Calculated [1] |
|---|---|---|
| Titanium | 22.7 | 22.5 |
| Carbon | 55.1 | 56.3 |
| Hydrogen | 4.8 | 4.7 |
| Chlorine | 15.4 | 16.6 |

[1] For bis (cyclopentadienyl) titanium chloride.

The compound prepared had an analysis agreeing very closely with that calculated for bis(cyclopentadienyl) titanium chloride.

A sample of the bis(cyclopentadienyl)titanium chloride (0.24 part by weight) was dissolved in 8.6 parts by weight of dry dimethoxyethane. This solution was contacted with 4.3 parts by weight of a silica-alumina having a silica-to-alumina weight ratio of 87 to 13. This silica alumina had been previously treated by heating first in a stream of nitrogen for 5 hours at a temperature of 1600° F. and secondly, in hydrogen for 5 hours at 1600° F. Upon contact of the pretreated adsorbent with the blue solution of the titanium compound it was evident that the adsorbent removed the titanium compound from solution since the solution turned colorless. Free solvent was removed by decantation. The solid was washed with diethylether and then dried by vacuum distillation. The resulting dry residue was a light blue powder. Upon contacting the light blue powder with air the color of the powder changed from blue to yellow.

EXAMPLE 2

Preparation of indicator tubes

Several indicator tubes similar to the tube illustrated in FIG. 1 were made. The tubes were made by necking down one end of a 5-inch long 8-millimeter O.D. Pyrex tube to form a frangible tip and then sequentially tapping a retaining wad, guard body, indicator, guard body, and retaining wad into the open end of the tube under a nitrogen atmosphere. Glass cloth was used as the retaining wad material, and 30–40 mesh silica was used as guard body material.

The indicating composition was prepared by placing a given quantity of the bis(cyclopentadienyl)titanium dichloride, a red powder into a bottle which was then capped, purged with nitrogen, and partially filled with dry and oxygen-free benzene. Sufficient triethylaluminum, in benzene solution, was added by syringe to provide a molar of TEA/Ti of 4/1. A blue solution resulted and this was transferred by syringe to a given quantity of catalytic grade silica (80–140 mesh and previously calcined at 1000° F.) contained in a flask under a dry nitrogen atmosphere. The solution was thoroughly mixed with the silica to impregnate it and the solvents and other volatiles were removed with gentle heating at reduced pressure. The finished indicating composition was then transferred to the indicator tubes under a nitrogen atmosphere.

A first batch of indicator material containing 1 weight percent titanium was placed in about ½ of the total number of tubes and a second batch of indicator material containing 1.5 weight percent titanium was placed in the other tubes. The 1 percent titanium material was light blue in color and the 1.5 percent titanium material was violet in color. After the top retaining wad was tapped into each tube, the open of the tube was heated and necked down to form a frangible tip. The resulting tube including the frangible tips was about 3½ inches long having sections of glass cloth and silica at either end which were about ¼ and ¾ inch long, respectively, and about ¾ inch long section of indicator in the center thereof.

EXAMPLE 3

Calibration of the indicator tubes with nitrogen

A miniature Brooks rotometer was calibrated with nitrogen at 1 atmosphere. The rotometer and the control valve were mounted on a tripod so that an indicator tube could be connected in a manner so that the gas to be tested would pass through the tube and then through the rotometer. The rotometer was adjusted to a setting corresponding to a 0.8 cubic foot per hour S.T.P. Tables I and II below illustrate calibration of indicators containing 1 and 1.5 weight percent titanium, respectively utilizing nitrogen containing various concentrations of oxygen. Blends of nitrogen with air in a calibrated stainless steel cylinder were made, and the amount of oxygen added in parts by million was calculated to 1 part per million or less. The oxygen concentrations in these blends are indicated in the first columns of Tables I and II.

TABLE I
[Indicator containing 1 wt. percent Ti]

| $N_2$ blend, p.p.m. added $O_2$ | Cubic ft. (S.T.P.) of gas used | Interface travel, mm. | Travel, mm./c.f./1 p.p.m. $O_2$ |
|---|---|---|---|
| 9.7 | 0.20 | 4 | 2.1 |
| 17.1 | 0.20 | 7 | 2.1 |
| 39.5 | 0.13 | 9 | 1.7 |

TABLE II
[Indicator containing 1.5 wt. percent Ti]

| $N_2$ blend, p.p.m. added $O_2$ | Cubic ft. (S.T.P.) of gas used | Interface travel, mm. | Travel, mm./c.f./1 p.p.m. $O_2$ |
|---|---|---|---|
| 29.5 | 0.20 | 6.5 | 0.82 |
| 76.5 | 0.13 | 8.5 | 0.85 |
| 124.5 | 0.067 | 6.0 | 0.72 |

Thus, the data in Tables I and II indicate that the indicator tubes made from any one batch of the indicator can be accurately calibrated.

EXAMPLE 4

Calibration of indicator tubes with ethylene

The data in Table III below indicates the calibration of indicator tubes containing 1 weight percent titanium when the interface travel of various concentrations of oxygen in ethylene were determined. The tests in Table III were carried out in substantially the same manner as the tests in Table I and II.

TABLE III
[Indicator containing 1 wt. percent Ti]

| | Cubic ft. (S.T.P.) of gas used | Interface travel, mm. | Travel, mm./c.f./1 p.p.m. $O_2$ |
|---|---|---|---|
| Ethylene blend, p.p.m. added $O_2$: | | | |
| 1.6 | 0.58 | 2 | 1.9 |
| 3.9 | 6.40 | 5 | 2.9 |
| 11.5 | 0.24 | 6 | 2.1 |
| Average | | | 2.3 |

The data indicate that sensitivity to oxygen in the presence of ethylene is very good. It is noted that several runs were made wherein acetylene was added to the ethylene-oxygen blend. There was no interference with the color change. Further tests indicated that the indicator was successful in determining the oxygen content of a sample of ethylene to be not more than 0.2 part per million.

The examples above indicate that the oxygen indicator and the oxygen indicator tubes of this invention can be used in the qualitative and quantitative measurement of oxygen at very low concentrations in nitrogen, ethylene, and other gases. Thus, this invention provides a method which is both rapid and sensitive to oxygen analysis at 1 p.p.m. or lower. Also, from the foregoing description of preferred embodiments of the several features of this invention, it will be apparent that the invention is not limited to the forms described.

We claim:

1. A process of detecting oxygen in a fluid stream comprising passing said fluid stream over an indicating material which is substantially free of molecular oxygen comprising a material having the general formula

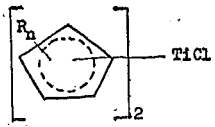

wherein $n$ is 0–3 and R is an alkyl hydrocarbon radical having up to and including 5 carbon atoms, combined on a light hued, inert, porous adsorbent support, whereby a color change is effected in said composition indicative of the presence of oxygen.

2. The process of claim 1 wherein said material is bis(cyclopentadienyl)titanium chloride and said support is selected from silica, alumina, and silica-alumina.

3. A method according to claim 2 wherein said oxygen in said fluid stream is present in an amount within the range of 0.01 to 1,000 p.p.m.

4. A process of producing an oxygen-indicating and scavenging material comprising heating a light hued, porous, inert absorbent support to a temperature in the range of 500–2000° F., removing substantially all molecular oxygen from said support, and combining by sorption on said support a compound having the general formula

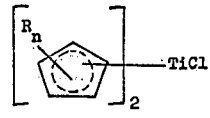

wherein $n$ is 0–3 and R is an alkyl hydrocarbon radical having up to and including 5 carbon atoms.

5. The material made by the process of claim 4.

6. The process of claim 4 wherein said molecular oxygen is removed by passing a stream of inert gas over said heated support.

7. The process of claim 4 wherein said compound is combined on said support by dissolving said compound in an inert solvent to form a solution, contacting said support with said solution thereby sorbing said compound thereon, and evaporating the solvent residue.

8. The process of claim 7 wherein said compound is bis(cyclopentadienyl)titanium chloride and said support is selected from silica, alumina, and silica-alumina.

9. The indicator of claim 8 wherein said transparent substantially oxygen impermeable material is glass.

10. A colorimetric oxygen indicator comprising a sealed tube made of a transparent substantially oxygen impermeable material adapted to be opened at its ends for passage of gas therethrough, and an indicator body being interposed between gas pervious retaining bodies of inert, permeable material, said indicating body comprising an indicating material substantially free of molecular oxygen comprising a compound having the general formula

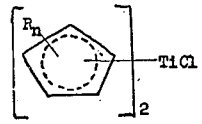

wherein $n$ is 0–3 and R is an alkyl hydrocarbon radical having up to and including 5 carbon atoms, combined on a light hued, inert, porous, adsorbent support.

11. The indicator of claim 10 further comprising guard bodies of an inert sorbent material interposed between said indicator body and said gas pervious retaining bodies.

12. The indicator of claim 11 wherein said gas pervious retaining bodies are made of inert fibrous material.

13. The indicator of claim 12 wherein said guard bodies are made of an inert sorbent material selected from silica, alumina and silica alumina.

14. The indicator of claim 13 wherein said indicating material is bis(cyclopentadienyl)titanium chloride combined on a support selected from silica, alumina, and silica-alumina.

15. A process of scavenging oxygen from a fluid stream containing a trace amount of oxygen comprising:
  passing said fluid stream over an indicating material which is substantially free of molecular oxygen comprising a material having the general formula

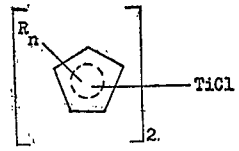

wherein $n$ is 0–3 and R is an alkyl hydrocarbon having up to and including 5 carbon atoms, combined on an inert, porous adsorbent support; and
  withdrawing a substantially oxygen free stream as a product of the process.

16. A method according to claim 15 wherein said oxygen in said fluid stream is present in an amount within the range of 0.01 to 1,000 p.p.m.

References Cited

UNITED STATES PATENTS 2,487,077  11/1949  Shepherd _____ 23—232

OTHER REFERENCES

Breslow et al.: J. Am. Chem. Soc. 79, 5072–3 (1957).
Feld et al.: The Organic Chemistry of Titanium, Butterworth, 1965, pp. 15 to 18 relied on.

MORRIS O. WOLK, Primary Examiner

R. M. REESE, Assistant Examiner

U.S. Cl. X.R.

23—253, 254; 252—408; 260—429.5